United States Patent Office 3,464,491
Patented Sept. 2, 1969

3,464,491
OIL RECOVERY FROM FORMATIONS CONTAINING CHANNELS
H R. Froning, Tulsa, Okla., assignor to Pan American Petroleum Corporation, Tulsa, Okla., a corporation of Delaware
No Drawing. Filed Dec. 18, 1967, Ser. No. 691,123
Int. Cl. E21b 43/24, 43/20, 33/13
U.S. Cl. 166—261
3 Claims

ABSTRACT OF THE DISCLOSURE

In underground combustion operations for recovery of petroleum from oil-bearing earth formations, bypassing of oxygen-containing gas through very high permeability channels, such as fractures, is reduced by filling a substantial portion of the channel or fracture with a foaming agent solution. Then, wherever gas tends to flow in the channel, a foam is generated to block the flow. An oil-sensitive foaming agent is used, so any foam formed in the oil-filled rock matrix breaks quickly, while foam in the substantially oil-free channel does not break so readily. The process can be varied for use in steam and waterfloods.

---

One method for recovery of petroleum from oil-bearing earth formations involves injecting air into the formation and igniting the oil in the presence of the air. Continued injection of air causes a burning zone to move through the formation. This zone evaporates most of the oil and water. In a forward combustion operation, the oil and water vapors are forced ahead of the burning zone toward a producing well. In many cases, it is found that a very high permeability zone, such as unconsolidated gravel, a fracture, or the like, extend between an injection well and a producing well. For example, the flow capacity of the channel may be 100 or even 1000 times the flow capacity of the rest of the formation combined. In such cases, even though the wells may be hundreds of feet apart, air injected into one well may appear at the other well in only a few days. Cases have been known in which the air so quickly sweeps the oil out of the fracture or other highly permeable channel that insufficient oil remains in the channel to support combustion. Because of the channel, insufficient air enters the less permeable portions of the formation to support combustion, so, in some formations, combustion cannot be maintained. The channel may be within the oil-bearing formation itself. It may also be within a formation so closely associated with the oil-bearing formation that separation of the channel from the oil-bearing formation at the wells by cementing operations or the like is not possible or is uncertain.

In some cases, plugging agents, such as silica gel, resins, smokes, or the like, have been injected into the formation to plug the high-capacity channels. The problem always arises in such cases, however, of removing the plugging agent from the low permeability zones, so as can enter these zones. Obviously, a method for plugging the highly permeable streaks or channels without at the same time permanently plugging the low permeability portions of the formation would be highly desirable. Similar problems arise in steam and water drives.

An object of this invention is to provide a method for reducing bypassing of a driving fluid through high-flow capacity channels in processes for recovering petroleum from earth formations. A more specific object is to provide a method for underground combustion recovery of petroleum which reduces bypassing of air through high-flow capacity channels. Another specific object of the invention is to provide a method for plugging the highly permeable channels in the formation subjected to underground combustion without permanently plugging the less permeable portions of the formation. Still other objects will be apparent from the following description and claims.

In general, I accomplish the objects of my invention by injecting into the formation an aqueous solution of an oil-sensitive foaming agent and sufficient gas to form a foam. By oil-sensitive, I means an agent which forms a foam which is untsable in the presence of oil. In very high-flow capacity channels, such as fractures, unconsolidated gravel, or the like, flow passages are very large, so a large portion of the oil is removed from these passages by the foaming agent solution. As noted above, so much oil is sometimes removed by air that the remaining oil is not sufficient to support combustion. In the less permeable portions of the formation, on the other hand, the pores are small and only a small portion of the foaming agent enters them because of the vary high-low capacity of the highly permeable channel or channels. Therefore, little oil is removed from the low permeability zones of the formation.

Since little oil remains in the high-flow capacity channels while little oil is removed from the low permeability zones, the oil-sensitive foam which forms in the low permeability zones breaks quickly while that in the high-flow capacity channels does not. This effect is further enhanced because the small volume of foaming agent entering the low permeability zones penetrates to only a short distance from the well. The high-flow capacity channels, on the other hand, are filled to a very great depth. In many cases, for example where air introduced into one well appears at another well in only a few days, it may be advisable to fill the high-flow capacity channel substantially completely with foaming agent solution from well to well.

When a fixed gas, such as air, methane, or the like, is injected into the formation containing the oil-sensitive foaming agent, a large percentage of the air at first enters the high-flow capacity channel. Foam immediately forms in this channel, reducing the rate of flow of gas into the channel. The deeper the air penetrates, the longer is the foam-filled passage and the smaller is the flow rate of gas into the channel. Eventually, of course, a large proportion of the gas is diverted into the less permeable zones and combustion can be initiated if that is the type of recovery operation to be used. In the case of steam and water drives, as soon as a large portion of injected fluid is diverted through the matrix pores, injection of steam or water can begin.

Referring specifically to use of the process in underground combustion, as soon as combustion begins, another advantage of my process occurs. Foams are heat-sensitive. The critical temperature of water is below most combustion temperatures in the formation. Near the combustion zone, therefore, the water and gas are in the same phase, so no foam can exist. As the burning zone moves through the formation, therefore, it quickly breaks any foam which might remain near the well bore in the low permeability zones leaving these zones entirely free from the blocking effects of foam.

It should be noted that when air is injected into the formation after the foaming agent solution has been introduced, at least a small portion of the air enters the low permeability zones and generates foam. As previously noted, these zones contain a considerable amount of oil. Therefore, only a small volume of the oil-sensitive foam is generated and most of this breaks rather quickly. Therefore, it is not to be supposed that the heating of the combustion operation is the principal cause for foam breaking. It does, however, serve to break any small amount of foam which remains in the matrix pores.

While there may be insufficient oil in the highly permeable channel to support combustion and thus heat the foam in this channel, the foam breaks behind the combustion front because of conduction of heat from the burning in the less permeable zones adjacent the channel. To the extent that foam is broken in the highly permeable channel, resistance to flow in this channel is decreased permitting gases to flow into the channel at an increasing rate. Now, however, these gases are heated by movement through the hot, burned-out formation so they have some tendency to break the foam in the channel. It will be realized, of course, that as soon as the gases move beyond the combustion zone, they are cooled to formation temperature. At this temperature, they generate more foam to block excessive flow of gases through the channel.

As soon as combustion is in progress, another action takes place to increase blockage of the high-flow capacity channel. The heat from the combustion vaporizes oil and water ahead of the combustion zone in a direct or forward combustion operation. The vapors move forward into the cooled formation where they condense to form a bank of oil and water which moves ahead of the combustion front. Gases, such as nitrogen, from the combustion zone, also move ahead of the hot zone. These move through the oil and water bank and on through the formation. As these gases move through the formation, ahead of the burning zone, and the oil and water bank, the gases tend to seek out the more permeable zones, such as the high-flow capacity channels. If the channels have been substantially completely filled with foaming agent solution, however, as soon as the gas enters the channel, the foam forms. This foam blocks, or at least reduces, further flow of gases through the channel. As a result of this action, the channel becomes filled with foam far ahead of the point where air has been able to reach by traveling through the foam-filled channel from the injection well. Thus, after the combustion operation has been in progress for a short time, the channel may become plugged with foam to a very great distance from the injection well so that substantially no air enters the channel.

As noted above, it may be desirable to fill the high-flow capacity channel with foaming agent solution substantially from well to well so that wherever gas enters this channel, a foam will be formed to block further bypassing of gas through the channel. Instead of injecting all the foaming agent solution through the injection well, it may be preferred to inject at least part of the solution through the producing well and into the channel. In order to prevent too rapid back-flow of the solution out of the channel into the producing well, it may be advisable to inject a volume of air or other gas through the producing well following the solution to generate foam in the channel for a considerable distance, such as 20 or 30 feet from the producing well.

Even after an underground combustion operation has been in progress for a considerable time, whether foaming agent has been injected into the formation from the injection well or not, the foaming agent solution can be injected into high-flow capacity channels through the producing well. Air or other gases may then be injected through the producing well and into the channels to generate foam or the fixed gases from the combustion zone can be depended upon to produce the foam. A combination of a little gas injected through the producing well to form foam near the well and a reliance on combustion gases to generate foam farther from the well is preferred.

My process is also well adapted to the type of underground combustion operation in which air or other gas is circulated for a time between the injection and producing wells before combustion is initiated. The purpose of the gas circulation may be, for example, to establish a rather high gas permeability, so injection pressures will not become excessive as the condensed oil and water bank builds up in front of the burning zone. Obviously, if there is a high-flow capacity channel in the formation, the air flows almost entirely through this channel rather than establishing gas permeability through the matrix pores of the formation.

In this case, the foaming agent solution is injected into the formation before the air is circulated. The solution should substantially completely fill the channel, preferably being injected into the channel through both the injection and producing wells. The foaming agent must be oil-sensitive so that when air is injected, the small amount of foaming agent entering the low permeability zones will generate little foam, and the small amount of foam which is formed will not last long in the presence of the oil. In the substantially oil-free channel, however, there is little foam breakage, so, as more air enters the channel, the channel becomes plugged to a greater depth. Eventually, the foam in the low permeability zone becomes substantially completely broken, while the channel becomes substantially completely plugged. As air traveling through the matrix pores approaches the front of the foam plug in the channel, the air tends to flow over into the channel. As the air reaches the channel, additional foam is quickly formed, however, to inhibit further flow.

When air permeability has been established through the matrix pores from well to well, a foam plug has been established in the channel substantially from well to well. Therefore, when the oil in the formation is ignited and combustion begins, there can be little flow of air through the formerly high-flow capacity channels.

This technique, as used in the preliminary establishment of air permeability, is particularly applicable to reverse combustion operations. In such operations, air is introduced into the formation through an injection well and flows to an exit well. When the air reaches the exit well, the oil is ignited at the exit well. A burning zone then travels back toward the injection well. In this process, it is obviously important that high-flow capacity channels be plugged during the air injection operation before the oil is ignited, so sufficient air will flow through the matrix pores to support the reverse combustion.

While reference has been made to the use of air as the oxygn-containing gas, it will be understood that other gases containing more or less oxygen than air can be used. The oxygen content of the oxygen-containing gas, the rate of injection of the gas, and the like, can be any of those commonly used in underground combustion or suggested in the prior art.

A convenient test of the oil stability of foams is described in U.S. Patent 3,330,346 Jacobs et al. In this test, a sand pack of No. 16 sand is prepared. This is sand with substantially uniform size grains, the average grain barely passing a No. 16 U.S. Standard sieve. The pack is about 35 feet long. It is filled first with brine, then oil displaces most of the brine, after which brine is again forced through the pack until the oil content is reduced to substantially the irreducible minimum volume. Sufficient of an aqueous solution of the foaming agent is then introduced to fill about 20 percent of the pore space of the pack. Finally, gas at a pressure of about 150 pounds per square inch is introduced into the pack to form a foam. Pressure is maintained on the gas for at least about 30 days and the gas flow rate is measured about every day. During the test, the downstream end of the pack is maintained at atmospheric pressure.

This test has the advantage that the brine and oil used in the test can be substantially the same as those present in the actual field operation. The foaming agent can also be used in the concentration to be used in the field and in water substantially the same as that available in the field for preparing the foaming agent solution.

When this test is applied to agents for use in my process, those which are to be considered satisfactory should produce a foam which is sufficiently oil-sensitive to permit the sand pack to recover at least about 5 percent of its permeability in ten days. If the foam is to be effective for plugging high-flow capacity channels containing small amounts of oil, however, the foam should be sufficiently stable in the test to prevent the sand pack from recovery more than about 30 percent of its permeability in ten days. These limits are set bearing in mind that the oil content of the matrix pores in a formation will be much higher than the irreducible minimum oil content of the sand pack so the foam will break much more quickly in the matrix pores. In the high-flow capacity channels, on the other hand, the oil content will be much lower than the irreducible minimum in the sand pack, so the foam will be much more stable in the channel.

Various types of foaming agents are listed in Table I of U.S. Patent 3,330,346 Jacobs et al., to which reference has been previously made. Others are listed in U.S. Patent 3,318,379 Bond et al. Still others will occur to those skilled in the art. The agent to be used, as well as the concentration of such agent in the solution injected into the oil-bearing formation, will, of course, vary somewhat with the salinity of the water in which it is dispersed or dissolved, the nature of the brine and oil naturally present, and the like. In general, the agent should be used in a concentration of about 1 or 2 percent by weight of the solution. A concentration of less than about 0.1 percent usually is not advisable because the agent is lost too quickly by adsorption on formation surfaces, solution in the formation oil and brine, or the like. Concentrations as low as 0.01 percent by weight have been observed to produce some benefits, however. Concentrations in the range of about 5 to 10 percent may cause a change in the nature of the foam, leading to less plugging action than is produced at lower foaming agent concentrations. Therefore, use of more than about 5 or 10 percent is often inadvisable, not only because of the greater cost, but because of poorer results. Obviously, one advantage of the flow test to determine oil sensitivity is that the same test can be used to check the effects of foaming agent concentration in the particular brine and oil system to which it is to be applied.

Under some circumstances, it may be advisable to repeat the treatment of the formation with foaming agent solution and gas. For example, even when underground combustion is being carried out in a formation having rather uniform permeability from top to bottom, the burning front will almost always streak through to the producing well at one level while the remainder of the burning front progresses only half, or perhaps two-thirds of the distance from the injection to the producing well. When this occurs, the burned-out streak becomes a high-flow capacity channel which takes most of the air.

My process, which is designed to plug high-flow capacity channels, can be applied to this problem by injecting a foaming agent solution into the formation through the producing well and following this solution with sufficient gas to form a foam. As in the case where my treatment is used to plug a channel not created by the recovery operation, the gas for forming the foam can come through the formation from the injection well. It is preferred, however, that at least part of the foam-generating gas should be injected into the formation through the producing well to avoid excessive displacement of foaming agent solution back into the producing well before a foam can form.

Since the burned-out streak will be rather hot, it may be advisable to precede the foaming agent solution with a volume of water to cool the streak. This decreases the tendency of the foam to break because of high temperatures.

The treatment of a burned-out streak to the producing well can also be used where the formation originally was not treated with foaming agent solution and gas through either the injection or producing well. That is, the treatment of the burned-out streak may be the first foam treatment of the formation, the first treatment through the producing well, or it may be a re-treatment of the producing well. It is possible that oil flowing through the formation toward the producing well may come in contact with foam in any high-flow capacity channel near the producing well. This contact may sometimes be sufficient to cause the foam in this channel to break even before the burning front approaches the producing well. In such cases, it may also be advisable to re-treat the formation through the producing well with foaming agent solution and sufficient gas to form a foam.

When the producing well is treated to seal a burned-out streak, a very stable foam forms in this streak, if it is cooled enough, since there is substantially no oil left in the streak. In the unburned portion of the formation, however, oil is still present, so any foam which forms in the unburned portion quickly breaks because of the oil-sensitive nature of the foam.

Treatment or re-treatment of the injection well after burning begins in a forward combustion operation is also possible under some circumstances. It is true that the burning operation removes oil from substantially all the formation surrounding the injection well. Therefore, a stable foam tends to form in all this portion of the formation completely blocking injection of air. If burning has not progressed very far from the injection well, however, it is possible to displace the foaming agent out into the oil-bearing portion of the formation by following the foaming agent solution with water. If the water displaces the foaming agent solution out into the oil-bearing portion of most of the formation before a foam-generating gas is introduced, then the foam which forms in the oil-bearing portion of the formation breaks permitting injection of combustion-supporting air into this portion. If insufficient air injection can be obtained in spite of these precautions, then a little light hydrocarbon liquid, such as hexane, heptane, or mixtures of these can be injected into the formation through the injection well to break the foam near this well and permit the desired rate of air injection.

The foregoing description has been directed principally to use of my process in underground combustion operations. With slight modifications, however, it can be used in other recovery systems, such as steam drives, waterflooding, and the like, which are based on the use of water in the liquid or vapor state, or on the use of fixed gases, such as air, methane, or the like. The process is not, of course, applicable to drives with liquids, such as low molecular weight liquid hydrocarbons, and the like, however, where the liquids tend to break the water-base foams.

In waterflooding, there is no gas to form a foam. Therefore, a slug of gas must be injected following the foaming agent solution and preceding the water. It is also advisable to inject at least occasional volumes of gas with the water to re-establish foam in any portion of the channel in which the foam may have started to collapse. Use of the technique in waterflooding has the advantage that there are none of the heat effects which may cause some difficulty in thermal drives, as explained above.

Steam drives are much like water drives except that the water is injected in vapor form and does not become liquid until it loses heat in the formation. It is necessary in steam drives to precede the stream by air to form a foam to block the channel and force the steam through the formation matrix pores. As in the case of water drives, it is advisable to inject a little air or other fixed gas intermittently or continuously with the steam to regenerate foam which may have started to collapse in the channel.

In steam drives, there may be heat stability problems with the foam. Unless steam temperatures can be maintained below about 400° F., and preferably below about 300° F., at least some breakage of the foam due to heat will occur. Thus, it is best to operate the steam drive at very low pressures, if possible, in order to keep the formation temperature below 300° F. In steam flooding, particularly at high temperatures, it is very important to plug the channel at the producing well with foam since this region remains cool until near the end of the process, so no heat breakage of foam occurs until the drive nears its end.

Many other variations of my process exist. For example, it may be advisable to inject a considerable volume of a gas, such as air, into the formation ahead of the foaming agent solution. The purpose is to sweep oil out of the high-flow capacity channel before the foaming agent solution is introduced, and thus remove even more of the oil than would be removed by the solution alone. Other variations, such as pumping the foaming agent solution slowly at low pressure to reduce the amount going into the matrix pores, will also be apparent to those skilled in the art. Therefore, I do not wish to be limited to the description given above by way of example, but only by the following claims.

I claim:

1. In a method for recovering petroleum from an underground oil-bearing formation penetrated by an injection well and a producing well, in which method an oxygen-containing gas is injected into the formation through said injection well, underground combustion of a portion of the oil is carried out, and another portion of the oil is recovered through said producing well, and in which a burned-out streak reaches said producing well, forming a high-flow capacity channel which permits by-passing of said gas through the channel from said injection well to said producing well, the improvement comprising injecting sufficient water through said producing well and into said channel to cool the portion of said channel near said producing well to a temperature below about 300° F., and then injecting into the channel an aqueous solution of oil-sensitive foaming agent to fill a substantial portion of said channel, injecting sufficient fixed gas to form a foam in said channel, and continuing the underground combustion operation to recover oil from portions of the formation other than said streak.

2. The method of claim 1 in which the concentration of said foaming agent in said solution is between about 0.1 and about 5 percent by weight of said solution.

3. The method of claim 1 in which said foam is sufficiently unstable in the presence of the oil in the formation to permit return of from about 5 to about 30 percent of the original permeability in 10 days in the following test:

(a) form a sand pack 35 feet long of No. 16 sand.
(b) fill said pack with brine at least similar to that naturally present in said formation.
(c) displace the brine with oil naturally present in said formation.
(d) displace the oil to substantially irreducible minimum content by flooding with said brine.
(e) introduce a quantity of said foaming agent solution equal to about 20 percent of the sand pack pore volume.
(f) apply gas to be used in forming the foam, said gas being applied at a pressure of about 150 pounds per square inch gauge to the end of said pack containing said foaming agent solution, the downstream end of said pack being at substantially atmospheric pressure.

References Cited

UNITED STATES PATENTS

| | | | |
|---|---|---|---|
| 3,115,929 | 12/1963 | Emery | 166—11 |
| 3,199,588 | 8/1965 | Holbert | 166—10 X |
| 3,251,414 | 5/1966 | Willman | 166—10 X |
| 3,269,460 | 8/1966 | Hardy et al. | 166—10 |
| 3,273,640 | 9/1966 | Huntington | 166—11 X |
| 3,318,379 | 5/1967 | Bond et al. | 166—9 |
| 3,330,346 | 7/1967 | Jacobs et al. | 166—9 |
| 3,342,261 | 9/1967 | Bond | 166—9 X |
| 3,369,601 | 2/1968 | Bond et al. | 166—11 X |

STEPHEN J. NOVOSAD, Primary Examiner

U.S. Cl. X.R.

166—272, 273, 294